(12) United States Patent
Chien (10) Patent No.: US 10,489,136 B2
(45) Date of Patent: Nov. 26, 2019

(54) AUTOMATIC FIRMWARE AND CUSTOM SETTING PROVISION FOR SERVER DEVICE

(71) Applicant: QUANTA COMPUTER INC., Taoyuan (TW)

(72) Inventor: Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/499,541

(22) Filed: Apr. 27, 2017

(65) Prior Publication Data

US 2018/0314507 A1 Nov. 1, 2018

(51) Int. Cl.
| | |
|---|---|
| G06F 9/445 | (2018.01) |
| G06F 8/61 | (2018.01) |
| H04L 29/08 | (2006.01) |
| G06F 8/65 | (2018.01) |

(52) U.S. Cl.
CPC ............. G06F 8/61 (2013.01); G06F 8/65 (2013.01); H04L 67/34 (2013.01)

(58) Field of Classification Search
CPC ..... G06F 8/68; G06F 8/61; G06F 8/67; G06F 8/65; G06F 8/71
USPC ........................................................ 717/170
See application file for complete search history.

(56) References Cited

U.S. PATENT DOCUMENTS

| | | | |
|---|---|---|---|
| 7,484,084 B1 | 1/2009 | Ranaweera et al. | |
| 2013/0091491 A1 | 4/2013 | Koutyrine et al. | |
| 2014/0123121 A1* | 5/2014 | Chiu | G06F 8/654 |
| | | | 717/168 |
| 2014/0130034 A1 | 5/2014 | Subbu et al. | |
| 2014/0143768 A1* | 5/2014 | Kazalski | G06F 8/60 |
| | | | 717/171 |
| 2017/0075676 A1 | 3/2017 | Li | |

FOREIGN PATENT DOCUMENTS

TW 201416975 A 5/2014

OTHER PUBLICATIONS

TW Office Action for Application No. 106125081, dated Apr. 30, 2018, w/ First Office Action Summary.
Extended European Search Report for EP Application No. 17186239.4, dated Mar. 9, 2018.

* cited by examiner

Primary Examiner — Chuck O Kendall
(74) Attorney, Agent, or Firm — Nixon Peabody LLP; Zhou Lu (57) ABSTRACT

A method for autonomously provisioning firmware and custom settings for a server device is provided. The method include determining an installation location and identification information of a server device installed into a rack device, wherein the server device is operating in a first mode of operation, the first mode of operation including at least one of a factory mode and a repair mode. The method also includes identifying a firmware package for the server device based on the installation location and identification information of the server device. The firmware is installed based on the determined installation location and identification information of the server device.

17 Claims, 8 Drawing Sheets

AUTOMATIC FIRMWARE AND CUSTOM SETTING PROVISION FOR SERVER DEVICE

FIELD OF THE INVENTION

The present invention relates to a system and method for autonomously provisioning firmware and custom settings for a server device.

BACKGROUND

During the last few years, considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

Most server-class computer systems on the market today have system components that require a firmware image to make them operational. "Firmware" is software that is stored in a read-only memory (ROM) (which may be reprogrammable), such as a ROM, PROM, EPROM, EEPROM, etc. Some examples of such components that require firmware are BMCs, the system basic input/output system (BIOS), storage controllers (e.g., SCSI/SAS/Fibre Channel components), and network interface controllers (NICs). These firmware images typically reside in the system flash memory where the BIOS resides or in component-specific flash parts.

As with any mechanical components, these system components can experience an operational problem that either degrades drive read-write performance or causes a drive failure. Some problems relate to drive firmware or hardware, including magnetic media, spin motor, read/write head assembly or drive circuitry. Such firmware and hardware problems generally dictate that the disk drive be returned to the original manufacturer for repair or replacement. Other potential problems are user-related, and often result from software problems within the storage operating system or user applications.

When operating in the server, the version of the installed firmware is customized and fully compatible to the peripheral IO of the motherboard. The settings of the firmware are typically aligned with the configuration of the chassis where it was installed. However, upon return of the system component after repair, the firmware may have been upgraded or downgraded during repair, i.e. configured in a repair mode. In addition, when providing a replacement or new system component, the firmware may be upgraded or downgraded relative to the original firmware, i.e. in a factory mode.

Restoration of the system component to its user mode with custom settings requires manually saving and restoring the system component settings and manually upgrading or downgrading reversion of the firmware per the customer's profile. However, manually performing these tasks can be burdensome in regards to costs and maintenance.

SUMMARY

Embodiments of the invention concern a system and method for autonomously provisioning firmware and custom settings for a server device. The method according to the various embodiments can include determining installation location and identification information of a server device installed into a rack device. In some embodiments, the server device is operating in a first mode of operation, where the first mode of operation includes a factory mode or a repair mode. Furthermore, the method can include identifying a firmware package for the server device based on the installation location and identification information of the server device. Furthermore, the method includes installing the firmware based on the determined installation location and identification information of the server device.

In some embodiments of the invention, the repair mode includes a firmware version and custom setting configured by a service engineer prior to service and uploaded to a cloud server. In some embodiments of the invention, installation of the firmware package includes using a baseboard management controller (BMC) to facilitate installation of the firmware. In some embodiments of the invention, using the BMC to facilitate installation of the firmware includes using the BMC to obtain a Basic Input Output System (BIOS) firmware image. In alternative embodiments of the invention, using the BMC to facilitate installation of the firmware includes using the BMC to obtain a Complex Programmable Logic Device (CPLD) firmware image.

In alternative embodiments of the invention, installation of the firmware package includes using a rack management controller (RMC) to facilitate installation of the firmware. Furthermore, in some embodiments of the invention, determining the installation location includes reading an RFID tag associated with the rack device and the installation location. In some alternative embodiments of the invention, determining the installation location comprises retrieving the server device identification information from an electrically erasable programmable read only memory (EEPROM).

In some embodiments of the invention, the firmware package is preserved in a system management software. The system management software can include a secure cloud server. Where the firmware package is preserved in a cloud server with secure protection, the firmware package can be configured as a data structure. In some embodiments, the data structure can include a package header that includes an array of certificates. In some embodiments of the invention, the data structure can include server device information, server device identification, firmware package data and/or image files corresponding with firmware validation. In some embodiments of the invention, a BMC can be used to obtain a firmware image from the cloud server, verify the firmware image is secured, and compare the server system identification between the firmware package and the server device identification information.

In some embodiments of the invention, installation of the firmware package configures the server device to operate in custom mode. In alternative embodiments of the invention, installation of the firmware package configures the server device to operate in user mode. In some embodiments of the invention, configuring the server device to operate in user mode includes loading a custom firmware and invoking software read/write interface to program the custom firmware setting to the server device. In some embodiments of the invention, the user mode includes a firmware upgrade from the first mode of operation. In alternative embodiments of the invention, the user mode includes a firmware downgrade from the first mode of operation. In alternative embodiments, the user mode includes an additional setting provision from the first mode of operation.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In order to efficiently restore the system component to a user mode with custom settings, preferred embodiments of the present invention provide a system and method for autonomously provisioning firmware and custom settings for a server device. In this disclosure, a server device operating within a server rack can require service or replacement. The server device operating in the server rack can be operating with a specific firmware and custom settings. However, upon service or replacement, the server component can be provisioned with a different firmware, custom settings, or without custom settings. For example, upon service or replacement, the server component can be provisioned to operate in repair mode or factory mode. The present disclosure provides an efficient method for autonomously provisioning firmware and custom settings for a server device and/or components therein after service or replacement.

In some embodiments, the physical location of the server device and the associated device information is determined. Furthermore, a firmware package for the server device can be identified based on the installation location and identification information of the server device. The firmware can be installed based on the installation location and identification information of the server device. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
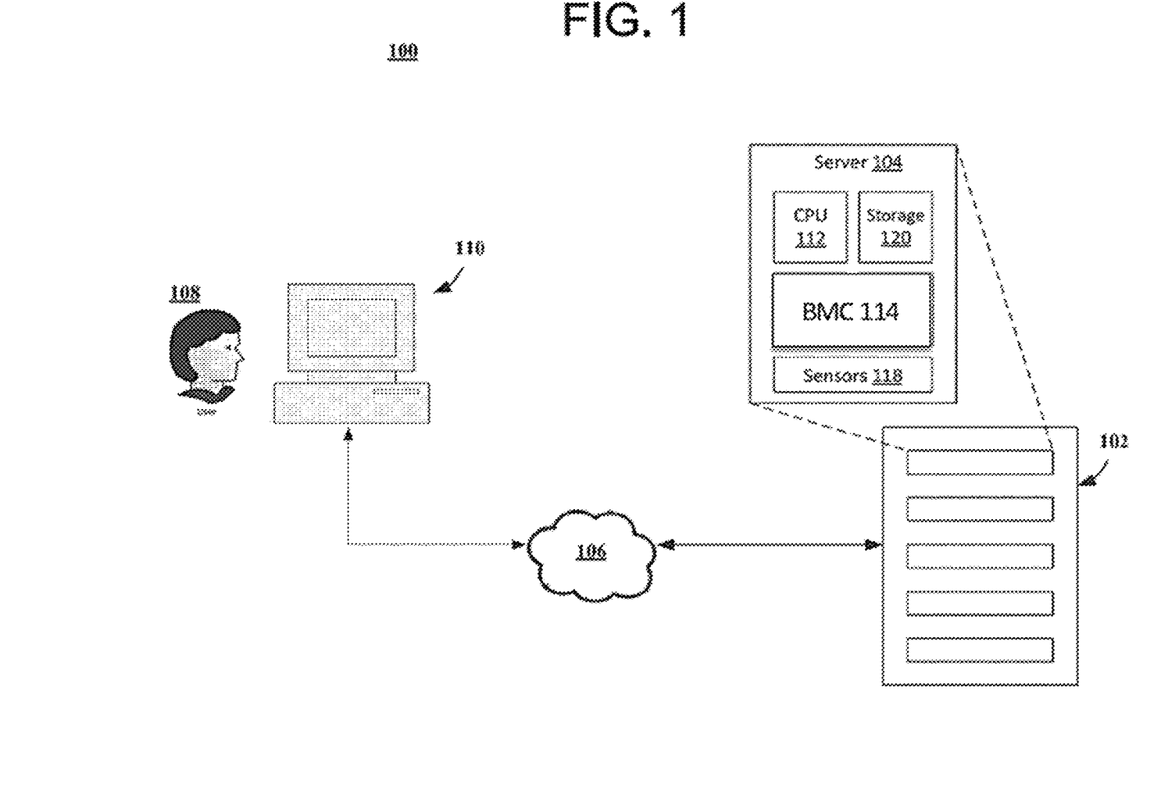
FIG. 1 is a high-level block diagram of a processing system in which the present invention can be implemented according to an embodiment.

FIG. 1 illustrates an example system 100 for autonomously provisioning firmware and custom settings for a server device, according to some embodiments. In some implementations, system 100 can include server rack 102 that includes multiple servers 104. Each server 104 can include various components such as one or more central processing units (CPU) 112, one or more service controllers such as a management controller (MC) 114, one or more sensors 118, one or more storage devices 120, and other components known in the art but not shown, such as power supplies, fans, memory modules, etc. In some embodiments, an exemplary MC can include a baseboard management controller (BMC), The approaches described herein are not limited to a particular service controller or set of service controllers.

CPU 112 can have multiple cores and be the main processor for server 104. In some embodiments, at least one of the servers 104 can include multiple CPUs 112. While reference is made herein to a "rack system," "server," "hard drive," "service controller" and the like, it should be understood that use of the singular in the examples herein does not preclude use of the plural in various embodiments.

In some embodiments, MC 114 is a specialized microcontroller (microprocessor), usually embedded on the motherboard of a computer, generally a server. For example, MC 114 manages the interface between system management software and platform hardware and monitors the physical state of server 104 using sensors and communicating with a terminal 110 associated with the system administrator 108 through an independent connection 106 (e.g., out-of-band). The system management software is discussed at detail below. MC 114 is part of the intelligent platform management interface (IPMI) and can operate independently of CPU 112.

In some embodiments, different types of sensors built into the server 104 report to MC 114 on parameters such as the installation location of a server component and the identification information of the server component. Server components can be a variety of IT components including, but not limited to, servers 104, storage devices, network switches, terminal servers, power distribution units, server racks 102, and so on. In some embodiments, the server rack 102 can include different types of server components, such as servers or other IT assets that may be operated from a server rack 102. For example, the server rack 102 or the servers 104 themselves can include radio frequency identification (RFID) tags that are configured to monitor the server components. Alternatively, the server rack 102 or the servers 104 themselves can include an electrically erasable programmable read only memory (EEPROM) (not shown), which supports reprogramming and reading authenticity. Furthermore, in some embodiments, the identification is readable by a compatible hardware circuit and software, built inside the MC 114 or rack management controller (RMC) (not shown). In some embodiments, the sensors 118 are devices that can be monitored by IPMI through MC 114.

Figure 2:
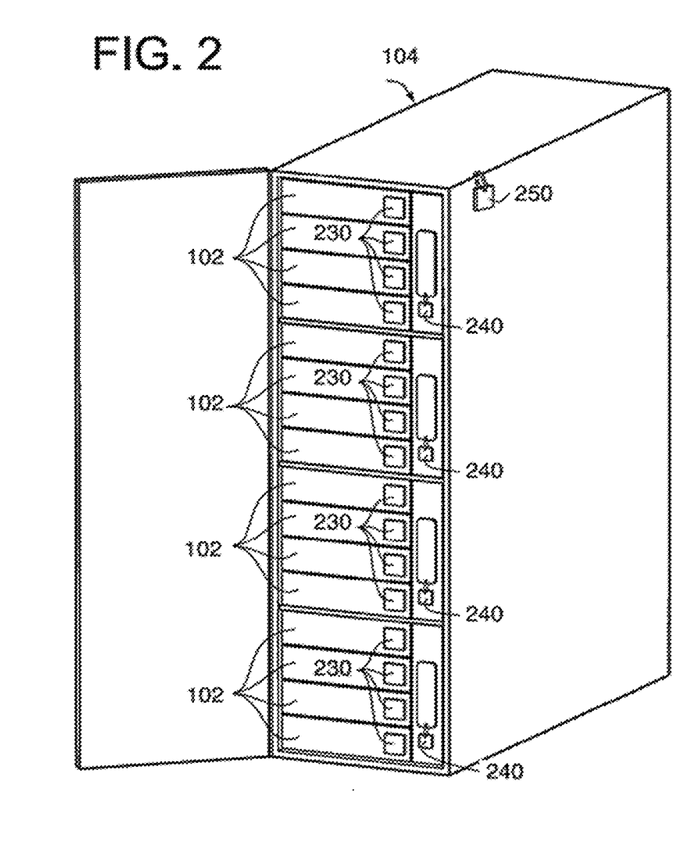
FIG. 2 is a block diagram of server components to be tracked implementing sensors installed within a server according to an embodiment.

FIG. 2 is a block diagram of server components to be tracked by implementing sensors installed within a server rack 102 or the servers 104 themselves according to an embodiment of the invention. As an exemplary embodiment, FIG. 2 implements RFID tags 230, 240, 250 attached to every asset that is to be tracked via the MC 114 or rack management controller (RMC) (not shown). In some embodiments, RFID tags 250 are associated with each server 104. RFID tags 240 can be associated with a cluster of servers 104. RFID tags 230 can be associated with the server rack 102. In one embodiment, the MC 114 or rack management controller (RMC) (not shown) may be maintained by an organization controlling the assets. The RFID tags 230, 240, 250 can be synchronized with appropriate information in the MC 114, including a description, owner, device serial number, location ID, and so on. In one embodiment, a previous bar code on an asset may be utilized for the synchronization. The information associated with the barcode is synchronized in the MC 114 to be further associated with the asset's new RFID tag 230, 240, 250.

In some embodiments of the invention, the RFID tags 230, 240, 250 are passive tags. In other words, the tags 230, 240, 250 do not include their own battery or other power source. Passive tags typically are made of less expensive material and components, and therefore require less cost to implement. An outside source, such as an antenna, activates the passive tag so that the tag sends a signal. This signal includes the identification information and the installation location of the system component to be tracked by the MC 114 or rack management controller (RMC) (not shown). An outside source may then read the signal being sent by the system component for the MC 114 or rack management controller (RMC) (not shown). In some embodiments of the invention, this outside source may be the same source that activated the tag. For example, the outside source can include a RFID reader module.

In alternative embodiments of the invention, the RFID tags 230, 240, 250 can include any one of or a combination of passive, semi-passive, or active tags. Semi-passive tags include a battery that powers the tag, but otherwise do not have the requisite power to send a transmission signal to an antenna. Active tags include a power source that supports that tag powering up, as well as supports transmitting signals to an antenna.

In some embodiments of the invention, the actual size of the RFID tags 230, 240, 250 are no bigger than the actual height of the component the tag is identifying. For example, the RFID tag may be one inch by one inch in size. In other embodiments, the tag is internally made of a foam material with a type of Mylar on the outside of the tag. This helps protect the tag from various outside forces that can affect the correct operation of the tag, such as pulling, twisting, and banging on the tag. In some embodiments of the invention, the RFID tags 230, 240, 250 are orientated at a horizontal angle to the antenna that is powering the tag in order to facilitate correct operation of the tag. In addition, the RFID tags 230, 240, 250 can be offset at least a quarter-inch away from the server component it is identifying in order to reduce interference between the component and the RF signal from the tag. In one embodiment, a boot or other structure may be used to facilitate the tag's offset from the server component.

In still other embodiments, it is envisioned that a variety of attachments may be utilized to attach the RFID tags 230, 240, 250 to a server component. For example, at least one of or a combination of a clip, tie, or adhesive material may be utilized to attach the tag to the component. This attachment may be used in such a way as to maintain the other requirements, such as orientation and offset, for the correct operation of the RFID tag. It should be realized that the sensors 118 can be any devices configured to identify the server components to which they are assigned. The RFID devices mentioned above are only for example, and not to limit this disclosure. The person having ordinary knowledge in the art may flexibly select any devices in accordance with the disclosure. Upon determining the installation location of the server component, a firmware package for the server component can be identified based on the installation location and identification information of the server device.

Figure 3A:
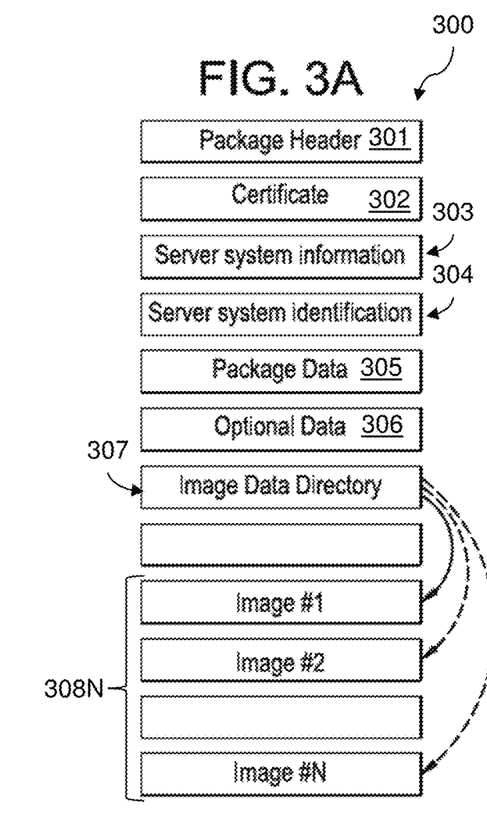
FIG. 3A shows an exemplary system management software in accordance with some embodiments.

FIG. 3A shows an exemplary system management software 300 in accordance with some embodiments. The system management software 300 can include a secured cloud server. In alternative embodiments of the invention, the system management software can include a local server. The system management software 300 can be configured as a data structure with a package header 301. The package header 301 can include an array of certificates 302. Furthermore, the system management software 300 can include server system information 303, and server system identification 304. Information and identification of the individual component can be included within the server system information 303 and server system identification 304, respectively. Furthermore, the system management software 300 can include package data 305, optional data 306 and an image data directory 307. The image data directory 307 can include images 308N. The image files 308N can include various firmwares, which have been validated as a production version.

Figure 3B:
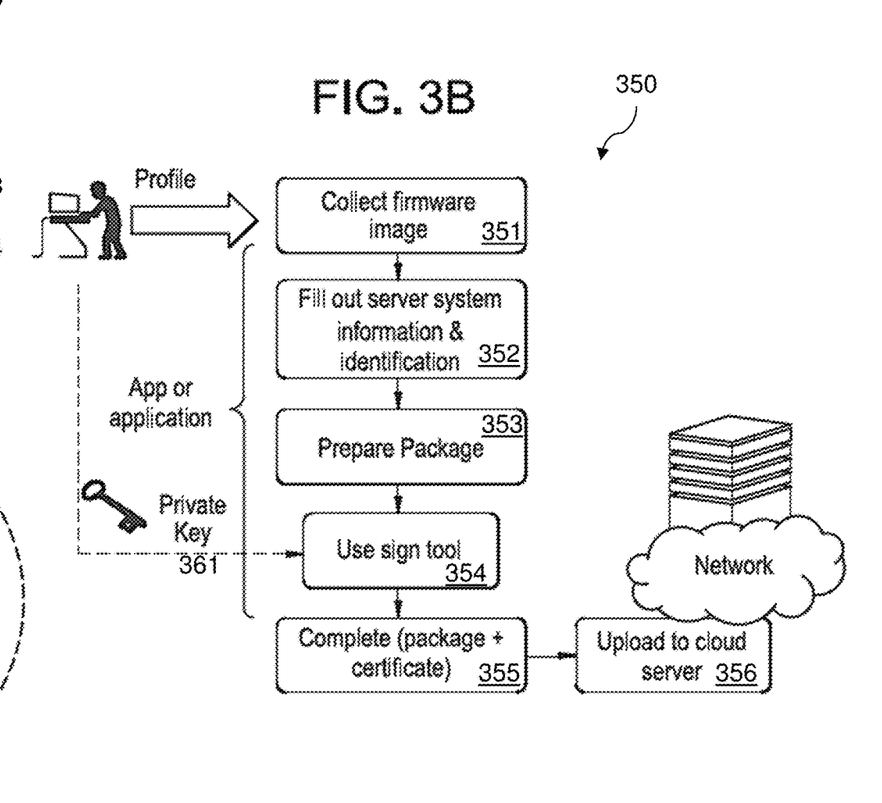
FIG. 3B is a block diagram of an exemplary methodology for uploading the firmware package using the system management software according to an embodiment.

FIG. 3B is a block diagram of an exemplary methodology 350 for uploading the firmware package using the system management software 300 according to an embodiment. At step 351, the firmware image 308N is collected from the server component by an operator 360. At 352, the server component information and identification is input into the system management software 300. At 353, the firmware package is prepared. Preparation of the firmware is discussed in greater detail below with respect to FIGS. 4-8. An owner private key 361 and a public key pair is associated with each server component. The public key pair is discussed in greater detail below. At step 354, a sign tool is used. The private key 361 is used to create a signature to retrieve a secure image or encrypt the server component. The private key 361 is used to sign the firmware package, and install the certificate at step 355. The current firmware is uploaded to the system management software 300 at step 356.

Figure 4:
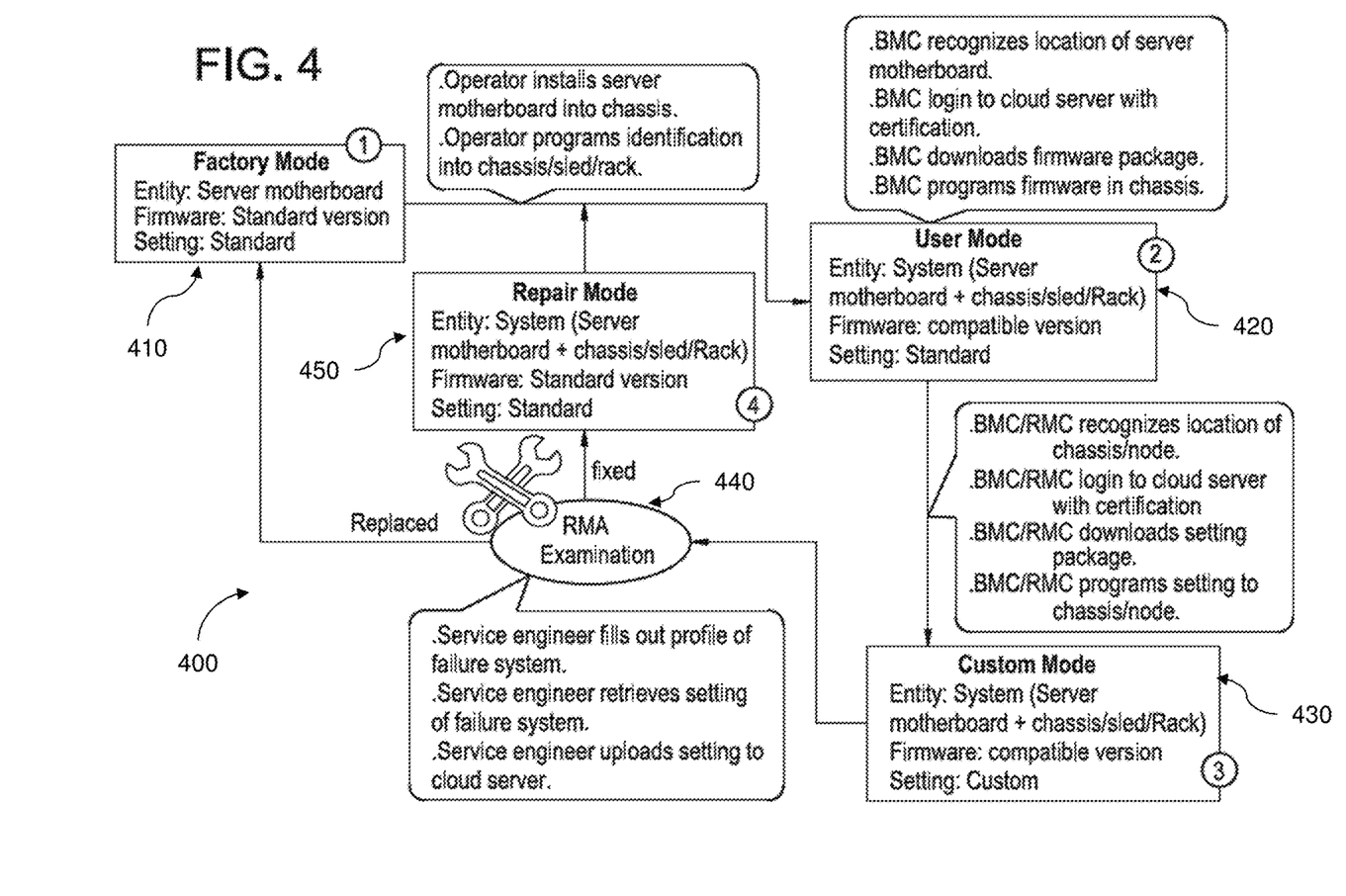
FIG. 4 is a block diagram of an exemplary methodology for the automatic provision of firmware for a server component according to an embodiment.

FIG. 4 is a block diagram of an exemplary methodology 400 for the automatic provision of firmware for a server component according to an embodiment. At step 410, the server component is received, provisioned to operate in factory mode. For example, the server component can include a newly built server motherboard, provisioned with a standard version firmware and standard settings. In some embodiments, when a new server motherboard received is built at a production line, the firmware version and firmware settings are predetermined based on basic validation. In some embodiments, basic validation includes standard testing items of hardware function on a server motherboard, wherein the settings of the motherboard is configured for factory testing items instead of custom setting testing items. In this state, every firmware is configured in factory mode. An operator can then install the server component into the server 104. The identification of the operational firmware associated with the server component can be logged into the server 104 and the server rack 102. This firmware will be associated with this server component and its installation location.

At step 420, upon installing the server component into the server 104 and the server rack 102, the MC 114 or rack management controller (RMC) can determine the installation location by reading the identification from a tag. Based on the determined installation location, the MC 114 or rack management controller (RMC) can login, at step 420, to a system management software (e.g., cloud based server) and download a firmware package appropriate for the server component located within the server 104 and the server rack 102. The MC 114 then upgrades or downgrades the firmware within the server component to provision the server component to operate in a user mode. For example, in a user mode, the server component can include a server motherboard installed in server 104 and the server rack 102 provisioned with a compatible version firmware and standard settings.

At step 430, upon installing the server component into the server 104 and the server rack 102, the MC 114 or rack management controller (RMC) can determine the installation location by reading identification from tag. Based on the installation location, the MC 114 or rack management controller (RMC) can login to the system management software (e.g., cloud based server) and download a settings package appropriate for the server component located within the exact server 104 and the exact server rack 102. The MC 114 then programs the settings within the server component to provision the server component to operate in a custom mode. For example, a customer may customize their private settings for optimal hardware performance.

In some cases, distinct settings require proprietary programming methods. For example, a storage controller can support a setting preprogrammed throughout band interface, such as LSI Storlib function. The MC 114 can use an Inter-Integrated Circuit (I²C) bus to program the custom settings for the server component. Protocol may involve Management Component Transport Protocol (MCTP) over I²C, I²C and Platform Environmental Control Interface (PECI) etc. Once the custom setting is provisioned, the firmware is running as custom mode at step 430. In the custom mode, the server component can include a server motherboard installed in server 104 of the server rack 102 provisioned with a compatible version firmware and custom settings. As with any mechanical components, the server component can experience an operational problem that either degrades drive read-write performance or causes a drive failure.

At step 440, a user can submit the required warranty claim with the system component with a return merchandise authorization (RMA) form to the vendor's customer service.

A service engineer can fill out a profile of the component failure in the system management software. In some embodiments, the service engineer can retrieve the setting of the component failure. Furthermore, the service engineer can upload settings to the system management software. In some embodiments of the invention, the system management software can include a secured cloud server. In alternative embodiments of the invention, the system management software can include a local server. The service engineer then programs the firmware within the server component to provision the server component to operate in a repair mode 450. When a service engineer repairs the server component, the MC 114 can recognize its variable of "state" as repair mode. Once the server component is installed into the server 104 and the server rack 102, the MC 114 can recognize its state as being in the repair mode. The MC 114 can reprogram the old firmware setting by loading files through in-band, out of band or EEPROM. For example, in the repair mode, the server component can include a server motherboard installed in server 104 and the server rack 102 provisioned with a standard version firmware and standard settings. Upon returning the server component to the user, the server component is reinserted into the server 104 of the server rack 102, and provisioned to operate in user mode (420). In an event the server component is replaced, a new server component, provisioned to operate in factory mode, is provided to the user (410) and the process can be repeated to reprovision.

Figure 5:
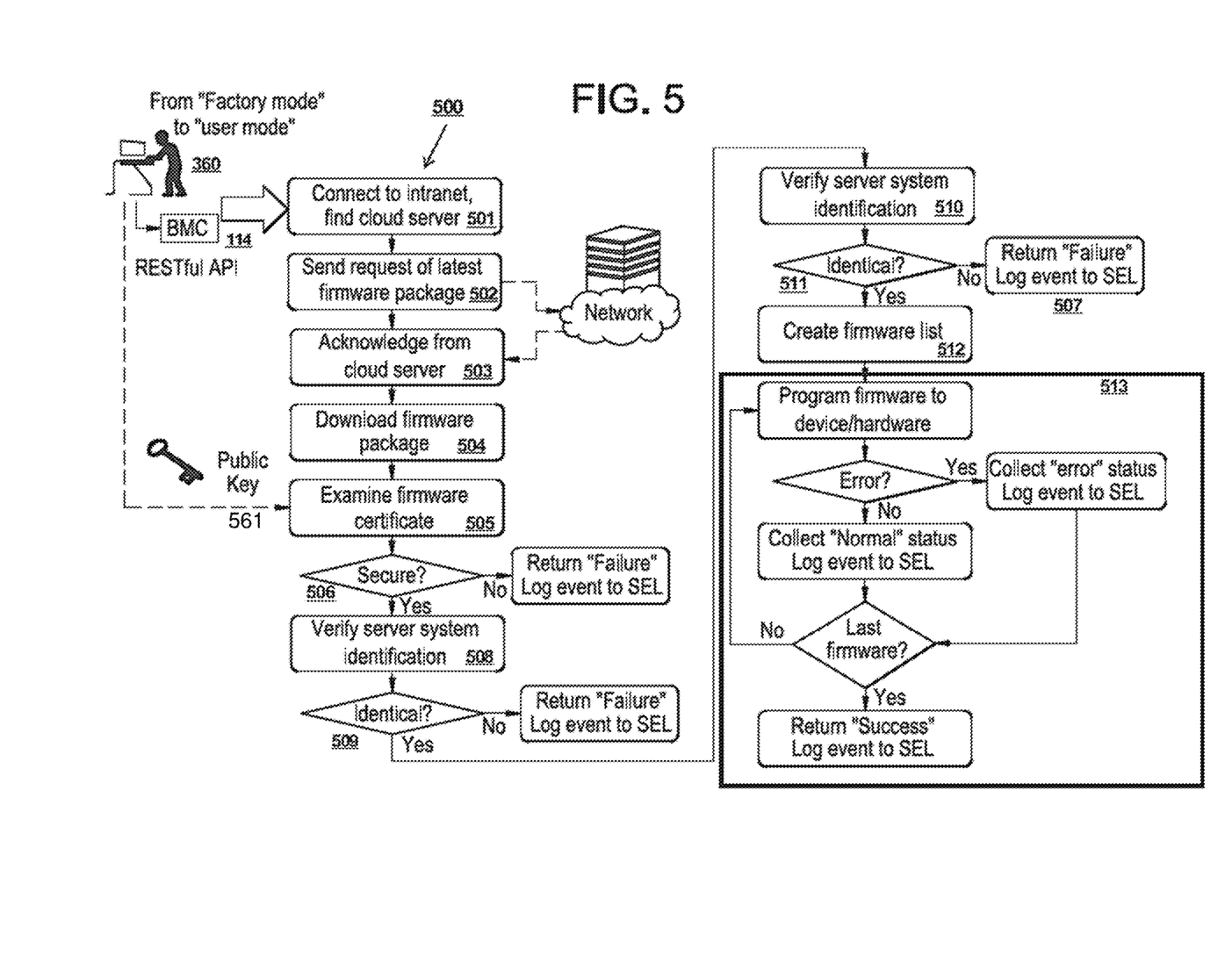
FIG. 5 is a block diagram of an exemplary methodology for upgrading or downgrading the firmware package using the system management software in user mode according to an embodiment.

FIG. 5 is a block diagram of an exemplary methodology 500 for upgrading or downgrading the firmware package using the system management software 300 in user mode according to an embodiment. When an operator 360 sends an Intelligent Platform Management Interface (IPMI) command or Representational state transfer (REST) or RESTful instructions to the MC 114, it requests the MC 114 transfer its variable of "state" from factory mode to user mode. At step 501, the MC 114 will examine its intranet connection to connect to a cloud server with specific IP address and domain name server. At step 502, the MC 114 sends a request to the system management software 300 for the firmware package. The request refers to the identification of a server component within the server 104 to search for the latest firmware package with the same identification within the system management software 300. An acknowledgement from the system management software 300 is received at step 503 to indicate receipt of the requests and delivery of the firmware package (step 504).

After the system management software 300 delivers the latest firmware package with the same identification to the MC 114, the MC 114 examines firmware package certificate of using the server product's public key 561, at step 505. The public key 561 is used to decode the secure image or decrypt the server component. At steps 506 and 508, a determination is made regarding the security of the firmware certificate. Where the firmware certificate is determined to be unsecure, the methodology 500 advances to step 507 where a failure event is returned. At steps 509 and 511, both the server component identification and the server component information are compared with the firmware package and the record of the server product to determine if they are identical. Where the comparison determines the two are not identical, the methodology 500 advances to step 507 where a failure event is returned. If the comparison determines the two are identical, the MC 114 ensures the firmware package is the one originally signed. A firmware list is created at step 512. At step 513, the verified firmware package can be used to upgrade/downgrade the firmware version in the server component. In the event of a failure, the package is not suitable for upgrade/downgrade. As a result, the operator may re-examine an error report of the eventlog, and proceed to a corrected action. In some embodiments, the corrected action can include, for example, re-uploading the firmware package to the system management software with a correct signature signed. This is the case where the error report of the eventlog indicates an incorrect signature was found.

Figure 6A:
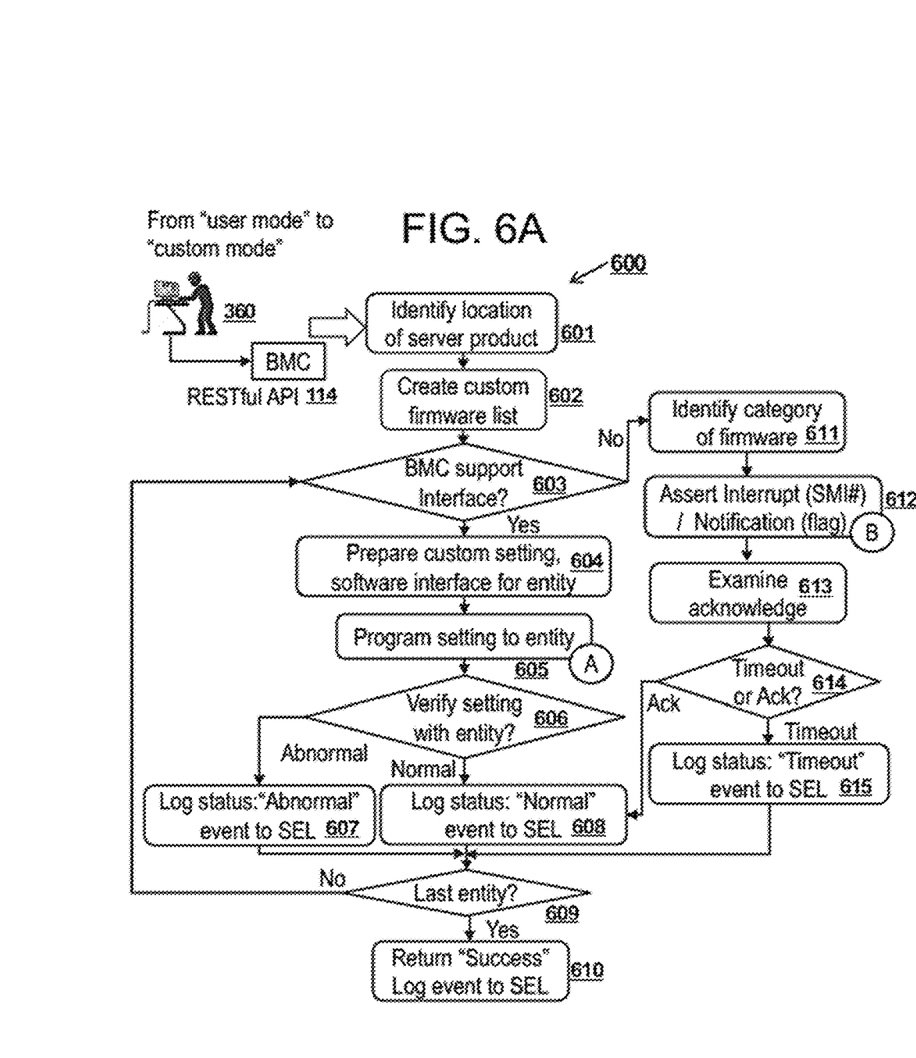
FIGS. 6A and 6B are a block diagram of an exemplary methodology for programming settings within the server component to provision the server component to operate in a custom mode according to an embodiment.

FIG. 6A is a block diagram of an exemplary methodology 600 for programming settings within the server component to provision the server component to operate in a custom mode according to an embodiment. When an operator 360 sends an Intelligent Platform Management Interface (IPMI) command or Representational state transfer (REST) or RESTful instructions to the MC 114, it requests the MC 114 transfer its variable of "state" from user mode to custom mode. At step 601, the location of the server component within the server device and server rack is determined. The custom firmware setting can be loaded from the non-volatile memory. The software read/write interface can be invoked to program the custom firmware setting to the server component. For example, the MC 114 can load the custom firmware setting of storage controller and the custom firmware setting program into the server component device using I2C interface and Management Component Transport Protocol (MCTP) over Peripheral Component Interconnect (PCI interface).

At step 602, the MC 114 creates a custom firmware list of the server component based on the installation location of the server component and the identification information of the server component. The MC 114 determines, at step 603, whether the MC 114 supports the interface to be installed.

Where the MC 114 does not support the interface, an alternative method can be implemented where a BIOS (basic input output system) can be used to load its custom firmware setting. The process 600 advances to step 611, where the category of the entity is identified. Next, the process proceeds to step 612, a system management interrupt (SMI) number flag is asserted notifying the BIOS to load the custom firmware setting. At step 613, an acknowledgement is received from the BIOS notifying the request is received and examined. Where the acknowledgement is received, the process advances from 614 to 608 where the completion stage determines the status is Normal (step 608), the upload is logged as success at step 610. Where an acknowledgement is not received, the process advances to step 615 where the process is determined to "Timeout." At this point, the process cycles through the request at 609, and either returns a "Success" notification at step 610 or restarts the process at step 603.

Where the MC 114 supports the interface, the methodology 600 advances to step 604 where the custom setting for the server component is prepared.

Figure 6B:
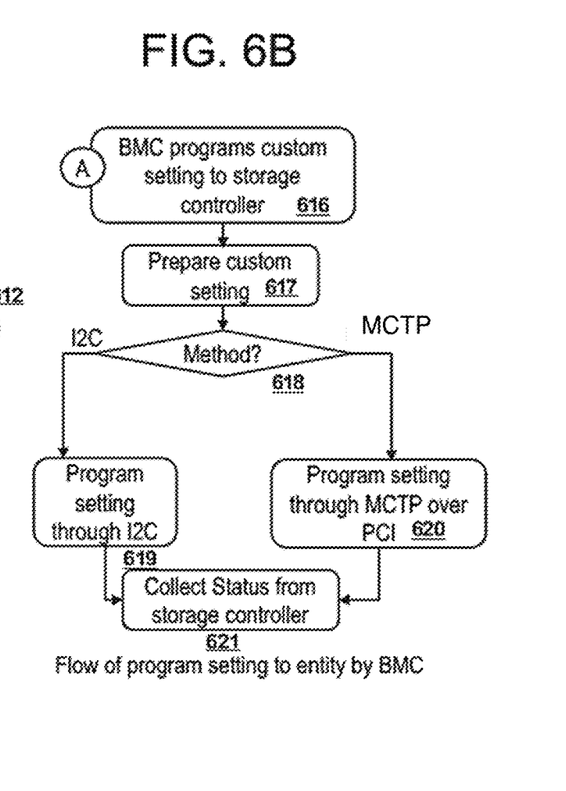

Referring now to FIG. 6B. The program setting is installed in the server component at step 605. Specifically, at step 616, the MC 114 programs the custom setting to the storage controller on the server component. The custom setting is prepared at step 617. The custom firmware setting can be loaded from the non-volatile memory. The software read/write interface can be invoked to program the custom firmware setting to the server component. For example, the MC 114 can load the custom firmware setting of storage controller and the custom firmware setting program into the server component device using I2C interface (step 619) or the Management Component Transport Protocol (MCTP) (step 620) over Peripheral Component Interconnect (PCI interface). The one of I2C and MCTP methods is selected at step 618. Once installed, the status from the storage controller can be collected at step 621.

Referring now to FIG. 6A. After loading the custom firmware setting of storage controller and the custom firmware setting program into the server component device, the settings can be verified at step 606. Where the verification stage determines the status is Abnormal (step 607) or Normal (step 608), the installation is logged as success at step 610.

In some embodiments, the custom firmware setting can be preserved in a non-volatile memory of the server component or the server 104. For example, the custom firmware setting can be preserved in the EEPROM of the MC 114, in a UEFI BIOS flash chip, or an EEPROM of the RMC. The format of the custom firmware setting can be limited by the device's software read/write interface, where writing the custom firmware setting to the device uses independent software interface which has been built inside the BMC, the UEFI BIOS or the RMC.

Figure 7:
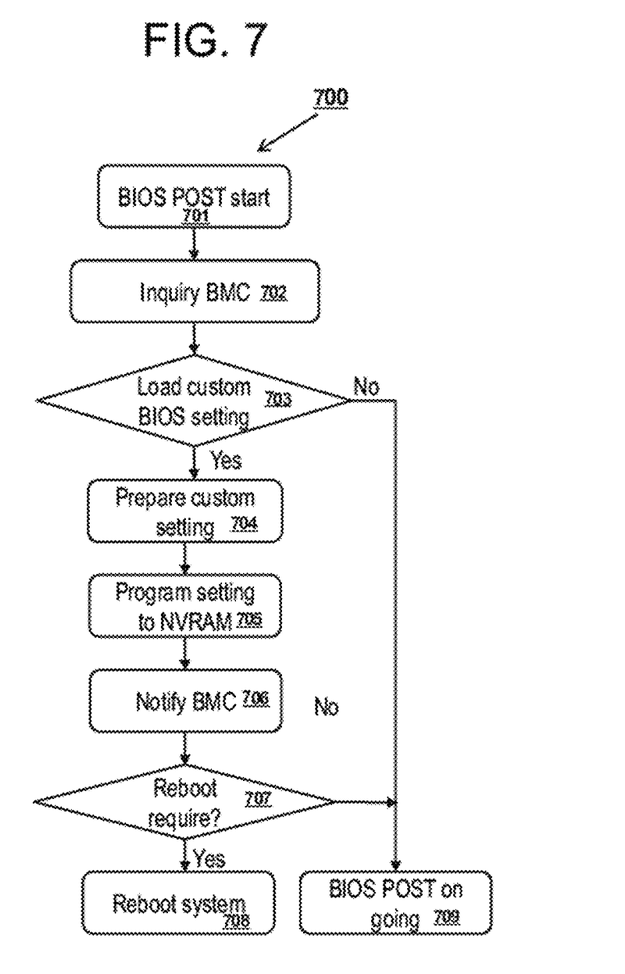
FIG. 7 is a block diagram of an alternative exemplary methodology for programming settings within the server component to provision the server component to operate in a custom mode according to an embodiment.

FIG. 7 is a block diagram of an alternative exemplary methodology 700 for programing settings within the server component to provision the server component to operate in a custom mode according to an embodiment. In the alternative exemplary process, an UEFI (unified extensible firmware interface) BIOS (basic input output system) can be used to load its custom firmware setting. As an initial matter, the MC 114 is queried for the custom firmware (BIOS) settings and configuration at step 702. At step 703, the MC 114 can determine whether to load the custom firmware (BIOS) settings and configuration of the storage controller and the custom firmware setting program into the server component device. Where the BIOS settings are determined to be configured to load, the process 700 advances to step 704, where the custom settings are prepared. At step 705, the program settings can be stored on the firmware nonvolatile random access memory (NVRAM), where the MC 114 is notified (step 706). The process advances to step 707 where a determination is made whether to boot the system and finalize the installation of the custom firmware. If an error occurs in the installation process, the process 700 advances to step 709, where the BIOS POST sequence load process repeats.

Figure 8:
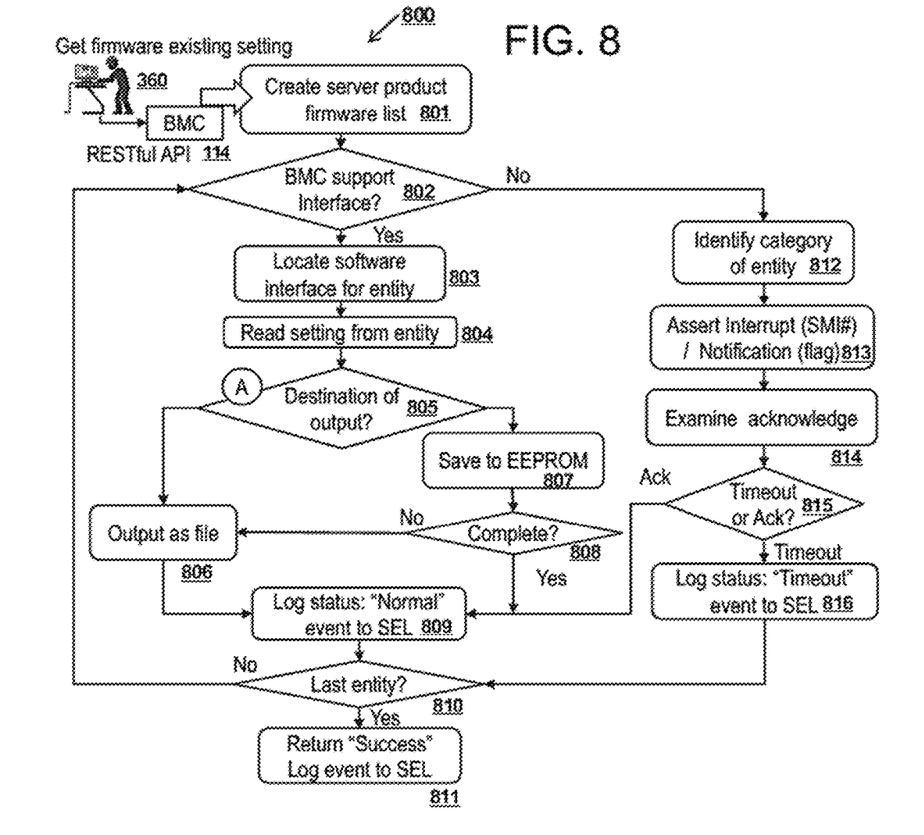
FIG. 8 is a block diagram of an alternative exemplary methodology for programing settings within the server component to provision the server component to operate in a custom mode using an RMA according to an embodiment.

FIG. 8 is a block diagram of an alternative exemplary methodology 800 for firmware setting reading in RMA state according to an embodiment. During the RMA state, a service engineer 360 can record the server component information and server component identification as a customer profile when the failure server component is received. Because a user can have new custom settings per their usage, the service engineer can get new custom firmware setting from the failed server component, or request the customer to provide their existing custom firmware setting from a servicing server component.

At step 801, a service engineer 360 sends the IPMI command or REST or RESTful instructions to the MC 114, and request the MC 114 to collect the firmware custom setting of all entities. At step 802, the MC 114 can determine if its software interface is configured to retrieve existing settings. If the MC 114 is configured to retrieve existing settings the process 800 advances to step 803, where the software interface is located. Thereafter, at step 804, the setting is read from the entity. In some embodiments, each one of the firmware existing/custom settings has a private format. The MC 114 can save the firmware setting as a text file, binary file, JavaScript Object Notation (JSON), or a file format deliverable through in-band service and out-of band service from the MC 114. At step 805, the process 800 determines the destination of the output. In some embodiments, the service engineer can decide to upload the file to the system management software 300 (step 806), or perform a backup to either the EEPROM of the server component (step 807), the EEPROM of the server rack 102 or the EEPROM of the RMC through the MC 114 influence.

After upload the file to the system management software 300 (step 806), or perform a backup to either the EEPROM of the server component (step 807), MC 114 determines if the upload is complete at step 808. Where the completion stage determines the status is Normal (step 809), the upload is logged as success at step 811.

Where the MC 114 is not configured to retrieve the existing settings, an alternative method can be implemented where a BIOS (basic input output system) can be used to load its custom firmware setting. The process 800 advances to step 812, where the category of the entity is identified. Next, the process proceeds to step 813, a system management interrupt (SMI) number flag is asserted notifying the BIOS to load the custom firmware setting. At step 814, an acknowledgement from the BIOS notifying the request is received and examined. Where the acknowledgement is received, the process advances from 815 to 809 where the completion stage determines the status is Normal (step 809), the upload is logged as success at step 811. Where an acknowledgement is not received, the process advances to step 816 where the process is determined to "Timeout." At this point, the process cycles through the request at 810, and either returns a "Success" notification at step 811 or restarts the process at step 802.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more embodiments, equivalent alterations and modifications will occur to others skilled in the art upon the reading and understanding of this specification and the annexed drawings. In addition, while a particular feature of the invention may have been disclosed with respect to only one of several embodiments, such feature may be combined with one or more other features of the other embodiments as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method comprising:
   determining an operating firmware for a server device, wherein the server device is operating in a first mode of operation, and wherein the first mode of operation comprises:
      a factory mode, the factory mode being associated with a replacement or new system component of the server device; and
      a repair mode, the repair mode being associated with a returned system component of the server device after repair;
   determining an installation physical location of the server device installed into a rack device;
   determining identification information of the server device;
   identifying a firmware package for the server device based on the installation physical location and identification information of the server device;
   comparing the identified firmware package to the operating firmware; and
   based at least in part on the comparison, installing the identified firmware package for the server device.

2. A method as recited in claim 1, wherein repair mode comprises firmware version and custom setting configured by a service engineer prior to service and uploaded to a cloud server.

3. A method as recited in claim 1, wherein installing the identified firmware package for the server device comprises using a baseboard management controller (BMC) to facilitate installation of the firmware package.

4. A method as recited in claim 1, wherein installing the identified firmware package for the server device comprises using a rack management controller to (RMC) facilitate installation of the firmware.

5. A method as recited in claim 1, wherein determining the installation physical location of the server device installed into the rack device comprises reading an RFID tag associated with the rack device and the installation physical location.

6. A method as recited in claim 1, wherein determining the installation physical location of the server device installed into the rack device comprises retrieving server device identification information from an electrically erasable programmable read only memory (EEPROM).

7. A method as recited in claim 1, wherein the firmware package is preserved in a cloud server with secure protection.

8. A method as recited in claim 7, wherein the firmware package is configured as a data structure comprising at least one of:
   a package header, wherein the package header comprises an array of certificates;
   server device information;
   server device identification;
   firmware package data; and
   image files corresponding with firmware validation.

9. A method as recited in claim 8, further comprising:
   using a BMC to obtain a firmware image from the cloud server;
   verifying that the firmware image is secured; and
   comparing server system identification between the identified firmware package and the determined identification information of the server device.

10. A method as recited in claim 1, wherein installing of the identified firmware package for the server device configures the server device to operate in custom mode.

11. A method as recited in claim 1, wherein installing of the identified firmware package for the server device configures the server device to operate in user mode.

12. A method as recited in claim 11, wherein configuring the server device to operate in user mode comprises loading a custom firmware and invoking software read/write interface to program the custom firmware setting to the server device.

13. A method as recited in claim 11, wherein the user mode comprises a firmware upgrade from the first mode of operation.

14. A method as recited in claim 11, wherein the user mode comprises a firmware downgrade from the first mode of operation.

15. A method as recited in claim 11, wherein the user mode comprises an additional setting provision from the first mode of operation.

16. A method as recited in claim 3, wherein using the BMC to facilitate installation of the firmware package comprises: using the BMC to obtain a Basic Input Output System (BIOS) firmware image.

17. A method as recited in claim 3, wherein using the BMC to facilitate installation of the firmware package comprises: using the BMC to obtain a Complex Programmable Logic Device (CPLD) firmware image.

* * * * *